(12) United States Patent
Maraffio et al.

(10) Patent No.: US 9,969,449 B2
(45) Date of Patent: May 15, 2018

(54) HOLDER FOR A TWO-WHEELER ACCESSORY

(71) Applicant: ABUS August Bremicker Söhne KG, Wetter-Volmarstein (DE)

(72) Inventors: Enrico Maraffio, Mellingen (CH); Ernst Pankratius, Wetter (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 152 days.

(21) Appl. No.: 15/186,618

(22) Filed: Jun. 20, 2016

(65) Prior Publication Data
US 2016/0368556 A1 Dec. 22, 2016

(30) Foreign Application Priority Data

Jun. 22, 2015 (DE) .................. 10 2015 109 995

(51) Int. Cl.
*B62J 11/00* (2006.01)
*B62J 7/00* (2006.01)
(Continued)

(52) U.S. Cl.
CPC ............ *B62J 7/00* (2013.01); *B62J 11/00* (2013.01); *B62H 2005/008* (2013.01); *E05B 2067/386* (2013.01)

(58) Field of Classification Search
CPC ....... B62J 7/00; B62J 11/00; B62H 2005/008; E05B 2067/386; Y10T 70/5872; Y10S 224/935
See application file for complete search history.

(56) References Cited

U.S. PATENT DOCUMENTS 6,095,386 A * 8/2000 Kuo .................. B62H 5/00
224/446
6,422,442 B1 * 7/2002 McDaid .............. B62H 5/00
224/441
(Continued)

FOREIGN PATENT DOCUMENTS

CN 103523124 A 1/2014
DE 9310011 U1 8/1993
(Continued)

OTHER PUBLICATIONS

European Search Report dated Dec. 9, 2016.

*Primary Examiner* — Corey Skurdal
(74) *Attorney, Agent, or Firm* — Dinsmore & Shohl LLP (57) ABSTRACT

A holder for a two-wheeler accessory comprises a fastening band having a first end and a second, loose end for wrapping around a tube section of a two wheeler; a securing element and a base body which has a support section for contacting the tube section of the two-wheeler, a holding device for the two-wheeler accessory or for an adapter-specific adapter piece, a leadthrough for at least the second end of the fastening band and a reception opening for the securing element oriented transversely to the leadthrough. The fastening band is in this respect displaceable along the leadthrough when it is led through the leadthrough. The securing element is furthermore movable into a securing position in which the securing element is located at least partly in the reception opening and the fastening band tensions the fastening band in the leadthrough by deflection and/or blocks it against a displacement.

23 Claims, 6 Drawing Sheets

(51) Int. Cl.
*B62H 5/00* (2006.01)
*E05B 67/38* (2006.01)

(56) References Cited

U.S. PATENT DOCUMENTS

| | | | | |
|---|---|---|---|---|
| 6,507,980 B2 * | 1/2003 | Bremicker | ............... | B62J 11/00 24/269 |
| 6,619,084 B2 * | 9/2003 | Kuo | ............... | B62H 5/00 224/425 |
| 6,971,564 B2 * | 12/2005 | Yang | ............... | B62H 5/00 224/425 |
| 7,311,233 B2 * | 12/2007 | Chen | ............... | B62J 11/00 224/425 |
| 8,083,112 B2 * | 12/2011 | Kuo | ............... | B62H 5/00 224/425 |
| 8,851,348 B2 * | 10/2014 | Zuraski | ............... | B62H 5/00 224/425 |
| 9,340,997 B2 * | 5/2016 | Zuraski | ............... | B62H 5/00 |
| 9,822,557 B2 * | 11/2017 | Zuraski | ............... | E05B 67/38 |
| 2002/0026694 A1 | 3/2002 | Bremicker | | |
| 2009/0032561 A1 | 2/2009 | Dacko | | |
| 2010/0139344 A1 | 6/2010 | Kuo | | |
| 2013/0015219 A1 * | 1/2013 | Zuraski | ............... | B62J 11/00 224/443 |
| 2016/0215527 A1 | 7/2016 | Steinkamp | | |

FOREIGN PATENT DOCUMENTS

| | | |
|---|---|---|
| DE | 20111004 U1 | 9/2001 |
| DE | 202004018834 U1 | 2/2005 |
| DE | 202007006811 U1 | 7/2007 |
| DE | 102007037439 A1 | 2/2009 |
| DE | 102008026739 A1 | 12/2009 |
| DE | 102008026740 A1 | 12/2009 |
| DE | 202014103690 U1 | 8/2014 |
| EP | 1182123 A2 | 2/2002 |
| GB | 2376713 A | 12/2002 |
| WO | 2013012786 A1 | 1/2013 |

* cited by examiner

HOLDER FOR A TWO-WHEELER ACCESSORY

CROSS-REFERENCE TO RELATED APPLICATIONS

This application claims priority of German Patent Application 10 2015 109 995.0 filed on Jun. 22, 2015.

FIELD OF THE INVENTION

The present invention relates to a holder for a two-wheeler accessory, in particular for a two-wheeler lock. Such holders are known to fasten two-wheeler accessories to a respective two-wheeler and thus to be able to take them along simply on a journey. The holder is then fastened to a frame, for instance, in particular to a tube section of the frame, of the two-wheeler. In order in this respect to be able to fix the position of the holder as individually as possible, and since the diameter and the shape of a respective frame tube can be very different for different sections of the frame or for different two-wheelers, it is desirable that the holder is flexibly adjustable to different dimensions.

BACKGROUND OF THE INVENTION

A possible type of fastening of such a holder is to strap the holder about a respective tube section by means of a tube clamp. However, for such a fastening, it is necessary for the tightening of the clamp to use a tool such as a screwdriver. Instead of a clamp, belts, for example textile bands, can also be used to wrap around a respective frame tube. But the belt has to be fixedly connected to the holder after the wrapping around the tube for a stable fastening, for which purpose, as a rule, the use of a tool, for example of a hexagon socket wrench, is necessary.

The necessity of using a tool is caused inter alia in that the fastening of the holder has to take place particularly firmly and reliably so that an accidental release of the holder is reliably prevented. For otherwise a release of the holder, in particular during a journey, could result in damage to the two-wheeler accessory or to the two-wheeler or also in a risk to the rider.

SUMMARY OF THE INVENTION

It is therefore an object of the invention to provide a holder for a two-wheeler accessory which can be fastened to a two-wheeler in a simple manner without tools and which ensures a stable and reliable arrangement of the holder.

The object is satisfied by a holder having the features of claim 1. This holder comprises a fastening band having a first end and a second, loose end for wrapping around a tube section of a two-wheeler and having a base body which has a support section for contacting the tube section of the two-wheeler, a holding device for the two-wheeler accessory or for an accessory-specific adapter piece and a leadthrough for at least the second, loose end of the fastening band. The object is in particular satisfied in that the holder furthermore comprises a securing element and in that the base body has a reception opening, which is aligned transversely to the named leadthrough, for the securing element, wherein the fastening band is displaceable along the leadthrough when it is led through the leadthrough, and wherein the securing element is movable into a securing position in which the securing element is located at least partly in the reception opening and tensions the fastening band in the leadthrough by deflection and/or blocks it against displacement.

In the holder in accordance with the invention, a movable securing element is therefore provided as a component of the holder and can be displaced by the user in a simple manner on the fastening of the holder to a two-wheeler, namely from a position genera releasing the leading through (of at least some) of the fastening band into the securing position to effect or at least support a reliable fastening of the holder to the two-wheeler. The releasing position, also called a release position in the following, can e.g. be present in that the securing element is released from the remaining holder, in particular from the base body, or e.g. in that the securing element is received less deeply in the reception opening than in the securing position. For example, the actuation of the securing element can comprise a simple linear displacement which can be achieved, for instance, by pressure by means of a finger. The fastening of the holder to the two-wheeler, but at least the final securing of the holder to the two-wheeler, can thus take place without tools. In addition, a particularly reliable fastening of the holder to the two-wheeler is achieved by the blocking and/or tensioning of the fastening band in the leadthrough of the base body of the holder.

The tensioning of the fastening band by deflection can in this respect in particular be achieved in that the securing element moves a section of the fastening band within the leadthrough of the base body away from the support section of the base body by the displacement of said securing element into the securing position. The named deflection of the fastening band can in particular comprise a deformation relative to an extent which is at least substantially in a straight line (e.g. by forming an indentation with a stronger curvature and/or deflection). The blocking of the fastening band can in particular be achieved in that—alternatively or additionally to the tensioning—the securing element moves into a shape-matched engagement with the fastening band by its movement into the securing position.

The fastening band can comprise plastic as the material, for example, in particular an elastomer and/or also a textile or another fabric. In general, however, materials of all kinds are conceivable which are suitable for forming a flexible fastening band. The fastening band is in this respect preferably essentially flat and elongate and thus has two elongate flat sides as well as two narrow sides (which may also be narrow edges) which connect the flat sides to one another transversely to the longitudinal extent.

The two ends of the longitudinal extent of the fastening band form a first end and a second end, wherein the second end is loose at least to the extent that it is not connected to the base body from the beginning, but is advantageously only led through the leadthrough of the base body and is fastened to the first end of the fastening band and/or to the base body for the fastening of the holder to the two-wheeler, in particular after wrapping around a tube section of the two-wheeler.

The first end of the fastening band can in contrast already be connected previously and in particular permanently to the base body. In general, however, it is also conceivable that the first end is released from the base body or is at least releasable. The first end is then preferably first connected to the base body on the fastening of the holder to the two-wheeler so that the final fastening in turn takes place in that the second, loose end is wrapped around the tube section of the two-wheeler and is fixed to the first end.

Not only a tip or a front edge of the fastening band is to be considered as the second, loose end of the fastening band in this respect. The second, loose end of the fastening band can rather substantially comprise the large part of the fastening band, in particular at least that part of the fastening band which can be led through the named leadthrough of the base body of the holder after wrapping round a respective tube section. However, the part of the fastening band which wraps around the tube section starting from the first end or which contacts the tube section can. also additionally be considered the second, loose end. In addition, the first end and the second, loose end of the fastening band can also be directly adjacent to one another and can together form the total fastening band.

Due to the leadthrough in the base body of the holder, a direction is defined in the base body in which the second, loose end of the fastening band can be led through the base body. The leadthrough generally extends continuously through the base body or at the base body (i.e. within the base body or at a surface of the base body), in particular in a straight line or curved. In a similar manner, the reception opening for the securing element defines the direction or the extent of the movability of the securing element. In this respect, the reception opening is aligned transversely to the leadthrough. The reception opening and the leadthrough therefore do not extend in parallel with one another, but are rather aligned relative to one another such that the securing element can advantageously at least cooperate with the fastening band led through the leadthrough at least in dependence on its respective position. The reception opening can in particular intersect the leadthrough, wherein the reception opening extends continuously or is closed at one end. It is in particular advantageous in this respect if the reception opening and the leadthrough are arranged perpendicular to one another. Other alignments are, however, also possible in which the securing element and the fastening band can cooperate at least in the securing position of the securing element.

The reception opening is preferably continuous and is additionally configured such that the securing element can be received in the reception opening by both sides thereof. The actuation of the securing element is thereby not fixed to one side of the holder.

In accordance with an advantageous embodiment, the leadthrough and the reception opening are at least formed in a similar manner to one another such that they can be replaced with one another from a functional aspect. In other words, the fastening band in such an embodiment can selectively be led through the leadthrough or through the reception opening and the securing element can selectively be received in the reception opening or in the leadthrough so that, for example, the fastening band can be led through the reception opening and the securing element is displaced in the leadthrough into a securing position in which it tensions the fastening band in the reception opening by deflection and/or blocks it against a displacement. The holder has a particularly large flexibility in use due to such a mutually corresponding design of the reception opening and of the leadthrough since there are more possibilities to arrange the fastening band and the securing element at the base body.

The first end of the fastening band is preferably fastened to the base body, that is it is in particular arranged at a fixed position, that is at a fixed relative position to the base body. As already presented, the fastening can be permanent or also releasable, with a releasable fastening in particular being able to take place in a latching manner.

Alternatively to a fastening of the first end of the fastening band to the base body, the first end can be guided through the leadthrough in a similar manner to the second end of the fastening band and can then be fixed therein, for instance also by means of the securing element or by means of another securing element, with the first and second ends of the fastening band then preferably being guided through the leadthrough in opposite directions to one another. A loop for fastening the holder to the tube section of the two-wheeler can also be formed by the fastening band in this manner.

In accordance with a further development, the first end of the fastening band is pivotably fastened to the base body. This has the advantage that the extent of the fastening band can be particularly easily adapted to the shape and size of the tube section when said fastening band wraps around the tube section. In addition to an increased flexibility, a more reliable hold of the arrangement of the holder at the two-wheeler thereby results from this.

Alternatively or additionally, the first end of the fastening band can furthermore be hung in at the base body. This kind of fastening can in this respect also be either permanent or releasable. The hanging in of the first end at the base body in particular represents a particularly simple kind of fastening, which can moreover effect the pivotability of the first end, when the fastening is releasable. In addition, a replacement of the fastening band can thereby be possible in a simple manner in order, for example, to use fastening bands of different lengths as required.

In accordance with a preferred further development, the first end of the fastening band has two lateral spigot sections by means of which the fastening band is hung to the base body in an associated reception recess. The two spigot sections are in this respect in particular coaxial and can, for example, form the ends of a substantially cylindrical pin section which is oriented perpendicular to the longitudinal extent of the fastening band and which can be formed integrally in the fastening band or as a separate element which is preferably fixedly connected to the fastening band. The cylinder axis of such a pin section or of the named spigot sections can then form a pivot axis of the first end of the fastening band.

Alternatively to this embodiment, the fastening band can have a hook section at its first end, said hook section engaging into an associated reception recess at the base body or engaging around an associated elevated reception portion at the base body. Conversely, however, the fastening band can also have an eyelet at its first end into which a hook section of the base body engages.

The named reception recess for hanging in the fastening band can in particular be provided at an end of the leadthrough for the fastening band or can be formed by the leadthrough.

Independently of the kind of the fastening of the first end of the fastening band at the base body, provision can be made that the fastening band is at least slightly elastic in order to generate a permanent tensile force between the first end and the second end by a tensioning of the fastening band during and/or after the wrapping around the tube section of the two-wheeler. The tensile force acting along the fastening band in particular has an effect such that the holder is held in a particularly stable and reliable manner at a fixed position at the tube section of the two-wheeler. For this purpose, the elasticity of the fastening band is preferably dimensioned such that it allows a tensioning of the fastening band to a degree in particular effected by the named securing element, on the one hand, but the elasticity must be limited, on the other hand, such that the tensile forces are achieved which are required for a stable arrangement of the holder at the tube section and the fastening band cannot, for instance, yield e.g. due to the weight of an accessory arranged at the holder and release from the tube section. A further advantage of the elasticity can comprise the fact that the second, loose end of the fastening band is led through the leadthrough for the fastening of the holder to the tube section and is subsequently stretched by pulling, e.g. by hand, so that the second, loose end of the fastening band in the leadthrough can block against a displacement by the securing element in a position in which the fastening band is tensioned and therefore contacts the tube section with an increased tensile force.

Alternatively to an elastic design of the fastening band, it is possible that the fastening band is substantially length-invariable or only has an insignificant elasticity. In this case, the fastening band wrapping around the tube section of the two-wheeler can admittedly not be stretched, but can in particular nevertheless be tensioned by the securing element to the degree that the securing element is urged in the manner of a wedge into the loop formed by the fastening band and thus any clearance which may be present between the fastening band and the tube section can be compensated and the fastening band can contact the tube section with increased tensioning force or contact force. A particularly stable and reliable fastening of the holder at the tube section can also be achieved in this manner.

In accordance with a preferred embodiment of the invention, a closure device is formed at the fastening band outside the base body for fixing the length of a loop formed by the fastening band. This closure device is located either always or at least outside the base body when a loop forms about a respective tube section for fastening the holder to this tube section through the leading of the second, loose end through the leadthrough. The closure device is therefore to be distinguished from the cooperation taking place in the base body of the securing element with the fastening band for its blocking and/or tensioning.

With such an embodiment with a closure device, provision can thus in particular be made for the fastening of the holder to the tube section of a two-wheeler that a loop is first formed around the tube section by means of the fastening band and its length is preferably first roughly minimized by a taut, tight lying at the tube section and is then fixed by means of the closure device. Subsequent to this, the fastening band can then additionally be blocked against a displacement by means of the securing element in the region of the leadthrough through which the second, loose end of the fastening band is guided or it can be tensioned for even tighter contact of the fastening band to the tube section which in particular acts with tensioning force and/or tensile force.

In this respect, the closure device can cooperate, in particular directly, between the first end and the second, loose end of the fastening band to fix an overlap of the two ends. The closure device can be formed in different manners for this purpose. The closure device can, for example, comprise a shape-matched mechanical closure, a magnetic closure or a hook and loop connection or can be formed in the manner of known closures for bracelets or wristwatches, for instance. In this respect, the fixing of a respective length of the loop formed by the fastening band can be possible as stepless or stepped, preferably with a step size of a few millimeters, in particular less than 3 millimeters. The closure device is in particular configured such that the fixing of the length of the named loop can take place in a simple manner without tools, In accordance with a preferred embodiment, respective fixing means are provided for forming such a closure device at the first end of the fastening band and at the second end of the fastening band in order to fix an overlap of the second end of the fastening band wrapping around the tube section of the two-wheeler and led through the leadthrough to the first end of the fastening band. The fixing means can in this respect advantageously be latching and can be aligned with respect to their latch effect such that they allow a reduction in the length of the loop formed by the fastening band, while an extending of the length of the loop, in contrast, is prevented by the fixing means. A fixed tightening of the fastening band wrapping around the tube section of the two-wheeler can thus be supported by means of such fixing means. As explained above, the first end and the second end of the fastening band are in this connection not necessarily only to be understood as a tip or as a front edge of the fastening band. The first end and the second end of the fastening band can rather each comprise a wide longitudinal section of the fastening band and/or a longitudinal section remote from a tip or front edge of the fastening band, with it only being important that the named first end and the named second end of the fastening band being opposite one another with respect to the provided wrapping around of the tube section of the two-wheeler.

The named overlap which is fixed by the named closure device or by the named fixing means is to be understood, on the one hand, such that the one end contacts the other end at least regionally in an overlapping manner if at all. On the other hand, the term "overlap" comprises the degree of overlap which is defined by where or with which section the one end contacts the other end of the fastening band.

In accordance with an advantageous further development, the first end of the fastening band has a plurality of holding noses to hold the second end of the fastening band in a contacting manner in the region of the holding noses at the first end, or vice versa, that is the holding noses can also be associated with the second end of the fastening band to hold the first end of the fastening band in a contacting manner in the region of the holding noses at the second end of the fastening band. The named holding noses therefore in particular serve to ensure that the first and second ends of the fastening band overlap at all, that is are held contacting one another. The holding noses formed at the one end of the fastening band can in particular be formed in pairs in order to grip around respective opposite narrow sides of the other end of the fastening band.

In this respect, the holding noses can be configured such that they prevent a release of the one end from the other end of the fastening band in a direction perpendicular to mutually contacting respective flat sides of the overlapping ends of the fastening band, but allow a sliding of the two ends of the fastening band relative to one another, in particular in the direction of their respective longitudinal extents. Furthermore, the holding noses can have a latching function so that a placing of the one end of the fastening band to the other end of the fastening band, in particular with the respective flat sides of the ends, is possible perpendicular to the longitudinal extent of the fastening band, but an opposite release is not possible. It is furthermore possible that the holding noses allow a sliding of the two ends relative to one another along the longitudinal extent of the fastening band when they hold the one end of the fastening band contacting the other end of the fastening band.

In accordance with a further preferred embodiment, the first end of the fastening band has at least one fixing tooth and the second end of the fastening band has a plurality of fixing notches in order to fix the degree of overlap by the engagement of the at least one fixing tooth in a respective fixing notch, A reverse arrangement is also possible, i.e. the fixing means associated with the second end of the fastening band can have at least one fixing tooth while the fixing means associated with the first end of the fastening band have a plurality of fixing notches. The at least one fixing tooth and the fixing notches can, alternatively or additionally to the named holding noses, be provided as a part of the named closure device. The exact relative position of the first end and the second, loose end of the fastening band relative to one another is in particular fixed by the cooperation of the at least one fixing tooth with the fixing notches (in particular fixed with respect to the longitudinal extent of the fastening band). In this respect, the cooperation of the fixing tooth and fixing notches can generally also contribute to holding the one end of the fastening band contacting the other end of the fastening band at all. However, this does not necessarily have to be the case, in particular when additional elements such as the described holding noses are provided for this purpose.

The at least one fixing tooth is preferably provided at a flat side of the fastening band and the plurality of fixing notches are provided at an opposite flat side of the fastening band in this manner, the at least one fixing tooth and the fixing notches are actually in contact for one another for cooperation when the fastening band is wrapped around to form a loop and the opposite flat sides of the fastening band thus at least regionally contact one another in an overlapping manner. The at least one fixing tooth and the fixing notches can be formed in the manner of a latching tooth and of latching notches respectively such that they advantageously cooperate with one another such that a reduction in the length of the named loop is made possible by the cooperation of the latching tooth and of the latching notches, but an increase in the length of the loop is not easily possible.

In accordance with a preferred embodiment, the securing element is adapted to deflect the fastening band located in the leadthrough by a movement into the securing position such that the fastening band is moved away from the support section of the base body in order hereby to tension the fastening band. The displacement of the securing element into the securing position thus effects a moving away of the fastening band from the support section of the base body. This can take place, for instance, in that the securing element is driven in the manner of a wedge between the support section or a section of the base body connected thereto in a stationary manner and the fastening band located in the leadthrough. Due to the securing element, the loop formed by the fastening band therefore so-to-say has to take a detour within the leadthrough by which the loop is tensioned for a particularly stable and reliable fastening of the holder at the tube section.

In accordance with an embodiment, the securing element does not only effect a moving of the fastening band away from the support section of the base body, but also simultaneously a blocking of the fastening band against a displacement along the leadthrough (and thus also a blocking of the fastening band against a displacement of the two ends of the band relative to one another). The named fixing of the overlap of the two ends of the fastening band by means of a closure device can thereby in particular be further assisted.

In accordance with a further advantageous embodiment, the leadthrough has a deflection space which is bounded with respect to the leadthrough direction of the fastening band at both sides by a respective deflection edge, with the region of the deflection space having an enlargement of the cross-section of the leadthrough with respect to the regions of the deflection edges. The reception opening for the securing element in particular intersects the leadthrough in the region of the named deflection space. At least when the securing element is located in a position not blocking the leading of the fastening band through the leadthrough, the second, loose end of the fastening band can thus pass through the deflection space along a direct, in particular minimal, path distance from the first deflection edge up to the second deflection edge. If, in contrast, the securing element is displaced into the securing position, the direct passing through of the deflection space is advantageously prevented and the section of the fastening band located in the deflection space is deflected to an extended path distance within the deflection space. The fastening band thereby, for example, carries out a bending at the one deflection edge in the leadthrough, then extends on a deflected path predefined by the securing element and made possible due to the cross-section increase about the securing element to the other deflection edge where it carries out a further bending in order finally to be led further through the leadthrough.

The path distance of the fastening band through the leadthrough is, on the one hand, extended by such a course of the fastening band such that the fastening band is tensioned for a firm contact of the holder at the tube section of the two-wheeler. On the other hand, the fastening band is substantially blocked against a displacement in the leadthrough, or is at least substantially prevented therefrom, in particular due to friction, due to the deflection at the two deflection edges and about the securing element (in its securing position).

Alternatively or additionally to the described tensioning of the fastening band by a deflection, the blocking of the fastening band in the leadthrough can also take place by an engagement, in particular in a shape-matched manner, of the securing element into a corresponding structure of the fastening band. The fastening band can, for example, have a plurality of engagement recesses at a flat side. The securing element can then engage into at least one of the engagement recesses in the securing position in order thus to prevent a displacement of the fastening band along its longitudinal direction, whereas the securing element is otherwise out of engagement with the engagement recesses so that the fastening band can be moved without impediment along its longitudinal extent through the leadthrough.

The engagement recesses can, for example, be configured as a ribbing let into the named flat side of the fastening band into which ribbing the securing element, in particular a web section suitably configured for this purpose, can engage, preferably in a shape matched manner. The engagement recesses can, for example, have a rectangular cross-section or, to form a latching function, an asymmetrically triangular cross-section in the longitudinal direction, with the securing element preferably being configured in a correspondingly complementary manner. The blocking f the fastening band in a tensioned position can be achieved in that the fastening band is led through the leadthrough and is tensioned, for instance by hand, by means of pulling, whereupon the (tensioned) position of the fastening band thus achieved in the leadthrough is fixed by displacing the securing element into its securing position.

It is furthermore advantageous if the securing element has a web section which extends in the direction of the movability of the securing element in the reception opening and which projects perpendicular to this direction, with the web section being adapted to deflect the fastening band in the securing position of the securing element and/or to engage into the fastening band. In such an embodiment, the web section can thus specifically be configured as suitable for the function of cooperating with the fastening band (that is, for instance, the deflection and/or engagement), while the other securing element can be configured with respect to a suitable guidance in the reception opening and a good handling capability, in particular for an actuation by hand.

In accordance with an advantageous further development, the web section has, in the direction toward the securing position, a flank which is slanted with respect to this direction in order increasingly to deflect the fastening band on a movement of the securing element into the securing position. The slanted flank thus acts in the manner of a wedge and facilitates the pushing in of the securing element between the fastening band and e.g. an inner wall of the leadthrough. The increase of the tensioning force or tensile force in the fastening band and on the tube section also takes place increasingly and thus in a gentle manner due to the increasing deflection. It is moreover generally conceivable that a desired tensioning force or tensile force or strength of the arrangement of the holder at the tube section can be set by how far the securing element is moved in the direction of the securing position.

Alternatively or additionally to this design, the web section can only extend over a part of the length of the securing element, in particular from an end of the securing element oriented in the direction away from the securing position over a part of the length of the securing element in the direction of an end of the securing element oriented toward the securing position. This part can in particular amount to approximately a third, approximately half, or approximately two thirds of the length of the securing element or more. Damage to the fastening band (for instance by crushing) can be particularly reliably avoided by a relatively short web section or by a relatively short engagement projection of the web section which engages into the fastening band in the securing position of the securing element. The stability of the securing element can, in contrast, be increased by a longer web section.

The named position of the securing element releasing a leading of the fastening band through the leadthrough can generally comprise the fact that the securing element is released from the base body and can for this reason alone not cooperate with the fastening band. It is, however, preferred for the securing element also still to be captively connected to the base body (e.g. to be at least partly received in the reception opening of the base body) when it is not in the securing position and is, for instance, located in a position in which it allows a running of the fastening band through the leadthrough substantially uninfluenced by the securing element.

It can be advantageous in this respect if the securing element and the base body cooperate with one another such that the securing element can, on the one hand, not be released, or can at least not be easily completely released, from the base body and is, on the other hand, secured in the release position and/or in the securing position against an unintentional displacement into the respective other position. It is therefore preferred if respective latching means are provided at the base body and at the securing element to latch the securing element in the securing position. Alternatively or additionally, it is furthermore preferred if respective securing means are provided at the base body and at the securing element to secure the securing element against an unintended release from the base body. A latching tongue can, for example, be formed at the securing element, in particular at an end region of the securing element free of a web section, said latching tongue, for example, being able to cooperate with one or more latching projections formed at suitable positions in the reception opening, or vice versa. The named securing means can, for example, have an abutment element at the securing element and a counter-abutment element at the base body, or vice versa.

BRIEF DESCRIPTION OF THE DRAWINGS

The invention will be described in more detail in the following only by way of example with reference to the drawings.

DETAILED DESCRIPTION OF THE PREFERRED EMBODIMENTS

Figure 1A:
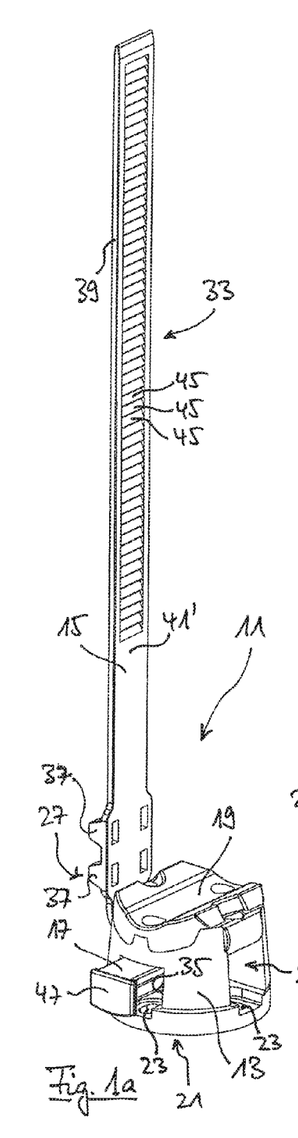
FIGS. 1a to 1c show an embodiment of a holder in accordance with the invention in different views.
Figure 1B:
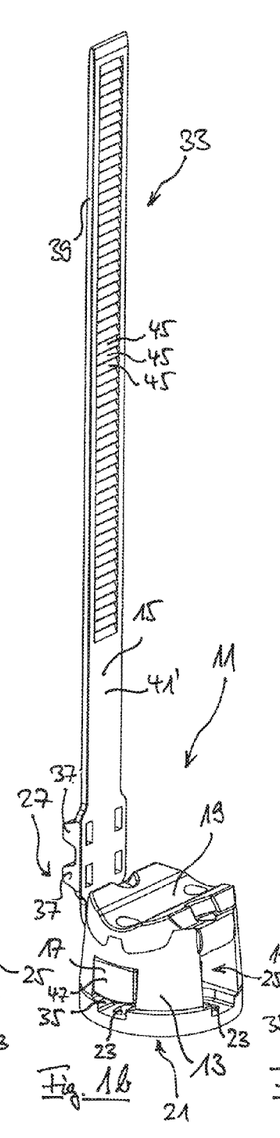
Figure 1C:
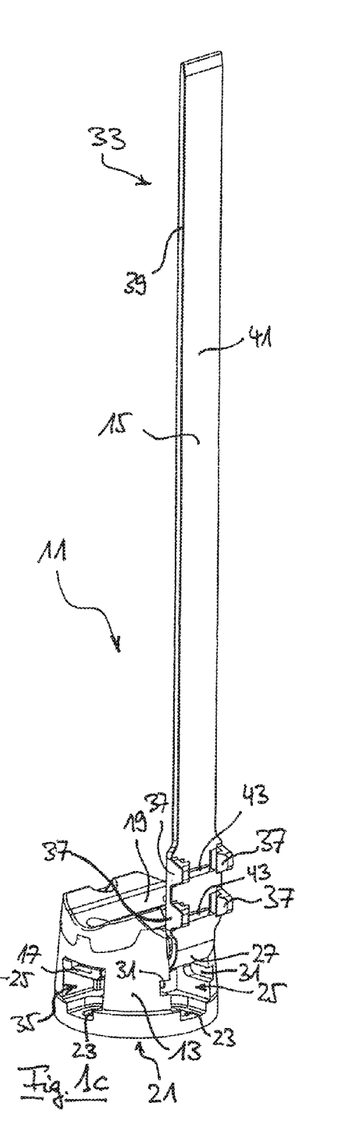

An exemplary embodiment of a holder 11 in accordance with the invention for two-wheeler accessory such as a two-wheeler lock is shown in a perspective representation in FIGS. 1a to 1c. The holder 11 in this respect has a base body 13, a fastening band 15 arranged thereat and a securing element 17. FIGS. 1a and 1b only differ from one another in that the securing element 17 is located once in a release position, i.e. in a position releasing a leading of the fastening band through the leadthrough (and located at the base body 13 here) (FIG. 1a) and once in its securing position (FIG. 1b). FIG. 1c corresponds to FIG. 1b, but shows the holder 11 from a different direction of view.

The base body 13 is substantially cylindrical, more precisely substantially frustoconical, and has at an end face shown at the top in the Figures a concavely formed support section 19 at which the base body 13 can be applied to a tube section of a two-wheeler (not shown) and which can be supported thereat. The oppositely disposed flat front face of the base body 13 forms a holding device 21 which has four bores 23 to be able to arrange or fasten thereby a respective accessory-specific adapter piece (not shown) at which the respective accessory can be supported. The bores 23 are arranged regularly distributed rotationally symmetrically with respect to a cylindrical axis or frustoconical axis of the base body 13 and have an angular spacing from one another of 90°. A suitable adapter piece can thereby be fastened to the named end face 21 of the base body 13 in four different rotational positions with respect to the cylindrical axis or frustoconical axis, whereby the holder 11 can be used in a particularly flexible manner.

Figure 7:
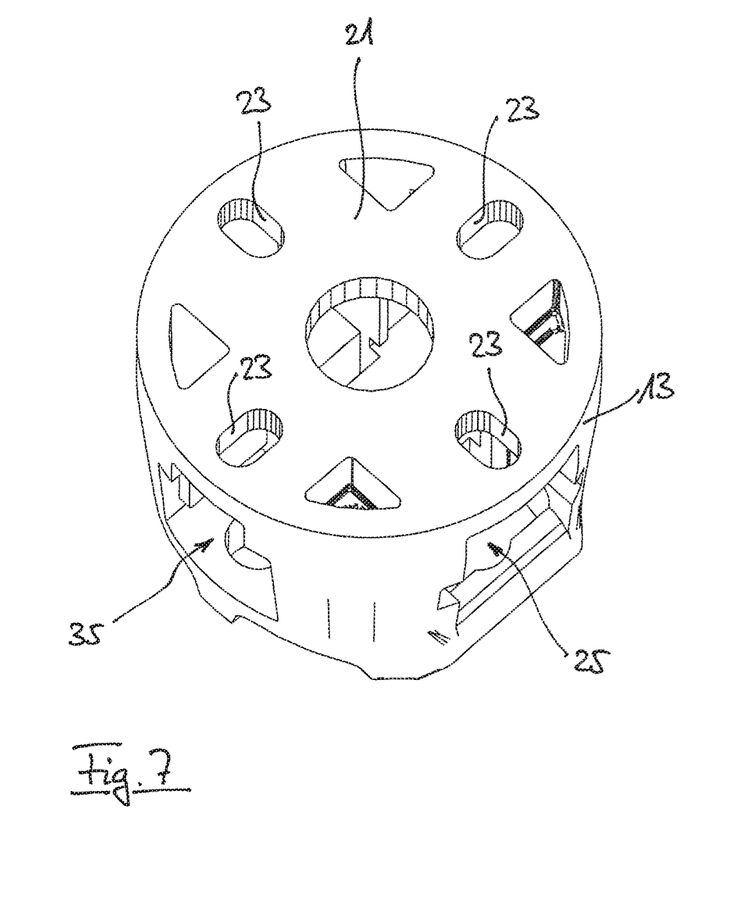
FIG. 7 shows the base body of an embodiment of the holder in a perspective representation.

The base body 13 of a similar embodiment of the holder 11 is shown from a direction of view in FIG. 7 in which the named end face 21 can be seen clearly. The bores 23 are also arranged in the described manner in this embodiment and thus allow a fastening of an adapter piece in at least four different angular positions relative to a cylindrical axis or frustoconical axis extending perpendicular through the center of the end face 21.

As can furthermore be recognized from FIGS. 1a to 1c, a leadthrough 25 extends through the base body 13 perpendicular to the cylindrical axis or frustoconical axis of the base body 13. The first end 27 of the fastening band 15 configured as an elongate, areal belt is pivotably hung in at its end at the outlet side (cf. FIG. 1). As can be recognized in FIGS. 2a and 2b, the fastening band 15 has at its first end 27 two lateral spigot sections 29 for this purpose which are placed into hang-in grooves 31 (cf. FIG. 1c). The fastening band 15 is in this manner connected in a pivotable and stable manner to the base body 13, but can be released from the base body 13 again by guiding the spigot sections 29 out of the hang-in grooves 31, for example to be able to replace the fastening band 15 with another fastening band 15 after damage or after wear or for adaptation to a different tube section.

The second end 33 of the fastening band 15 disposed opposite the first end 27 with respect to the longitudinal extent of the fastening band 15 is loose initially, that is before an arrangement of the holder 11 at a tube section of a two-wheeler, and can be led into the leadthrough 25 at the inlet side (cf. FIGS. 1a and 1b) and through the leadthrough 25 such that it exits the leadthrough 25 again at least in part at the outlet side. The fastening band 15 can in this manner form a loop for wrapping around the tube section of a two-wheeler. In this respect, the holder 11 then contacts the tube section by the support section 19 and by a part of the fastening band 15 forming the loop.

An axially continuous reception opening 35 in which the securing element 17 is movably supported between the release position (FIG. 1a) and the securing position (FIG. 1b) is likewise formed perpendicular to the named cylindrical axis or frustoconical axis and perpendicular to the extent of the leadthrough 25 in the base body 13. While the securing element 17 tensions the fastening band 15 in the leadthrough 25 by deflection in the securing position and blocks a displacement, the fastening band 15 can be led through the leadthrough 25 without impediment when the securing element 17 is in the release position in order in this manner to adapt the loop formed by the fastening band 15 to a periphery of the respective tube section such that the support section 19 and the fastening band 15 tightly contact the tube section.

Once this setting has been carried out, that is once the formed loop has been minimized in its length by pulling at the second end 33 of the fastening band 15 exiting the leadthrough 25, this part of the second end 33 exiting the leadthrough 25 can be laid at the first end 27 of the fastening band 15 such that the first and second ends 27, 33 at least partly overlap one another, To secure this overlap and maintain it at a constant amount, fixing means are provided at the first end 27 in the form of four resilient holding noses 37 which are configured in pairs to engage around opposite narrow sides 39 of the fastening band 15, in particular of the second end 33 of the fastening band 15. The holding noses 37 are in this respect formed by a corresponding chamfer such that the second end 33 of the fastening band 15 can be urged past the holding noses 37 toward the first end 27 of the fastening band 15 for forming the mutual overlap, but is then held by the holding noses 37 and is in particular prevented from being released from the first end 27 again (at least in the reverse direction).

The holding noses 37 admittedly generally still allow a sliding of the second end 33 at the first end 27 in the direction of their respective longitudinal extents. To fix the amount of overlap, however, respective fixing teeth in the form of latching teeth 43 are formed as further fixing means between a pair of holding noses 37 at a flat side 41 of the fastening band 15 at the first end 27, said latching teeth cooperating with fixing notches in the form of latching notches 45 formed at the opposite flat side 41' at the second end 33 of the fastening band 15. In this respect, a respective latching tooth 43 engages into a respective one of the plurality of latching notches 45 formed at the second end 33 in dependence on the longitudinal position of the second end 33 of the fastening band 15 overlapping the first end 27 and thus prevents the second end 33 from being able to slide in a direction with respect to the first end 27 by which the loop formed by the fastening band 15 would be extended. Due to the configuration of the fixing teeth and fixing notches as latching teeth 43 and latching notches 45, in contrast, an oppositely disposed sliding of the second end 33 is possible at the first end 27 for shortening the loop formed by the fastening band 15. The named fixing means (holding noses 37, latching teeth 43, latching notches 45) thus form a closure device for fixing the length of a loop formed by the fastening band 15.

Once the holder 11 can already be arranged with a certain stability at a respective tube section of a two-wheeler by securing and fixing the overlap of the first and second ends 27, 33 of the fastening band 15, the stability and above all the reliability of this fastening can be further increased by displacing the securing element 17 into the securing position. To allow a particularly simple displacement of the securing element 17, it has an areal fastening section 47 at an end of its longitudinal extent which is formed perpendicular to this longitudinal extent and by means of which the securing element 17 can be moved in a simple manner into the securing position in the direction of its longitudinal extent by pressure of a finger.

Figures 2A, 2B, 3A, 3B:
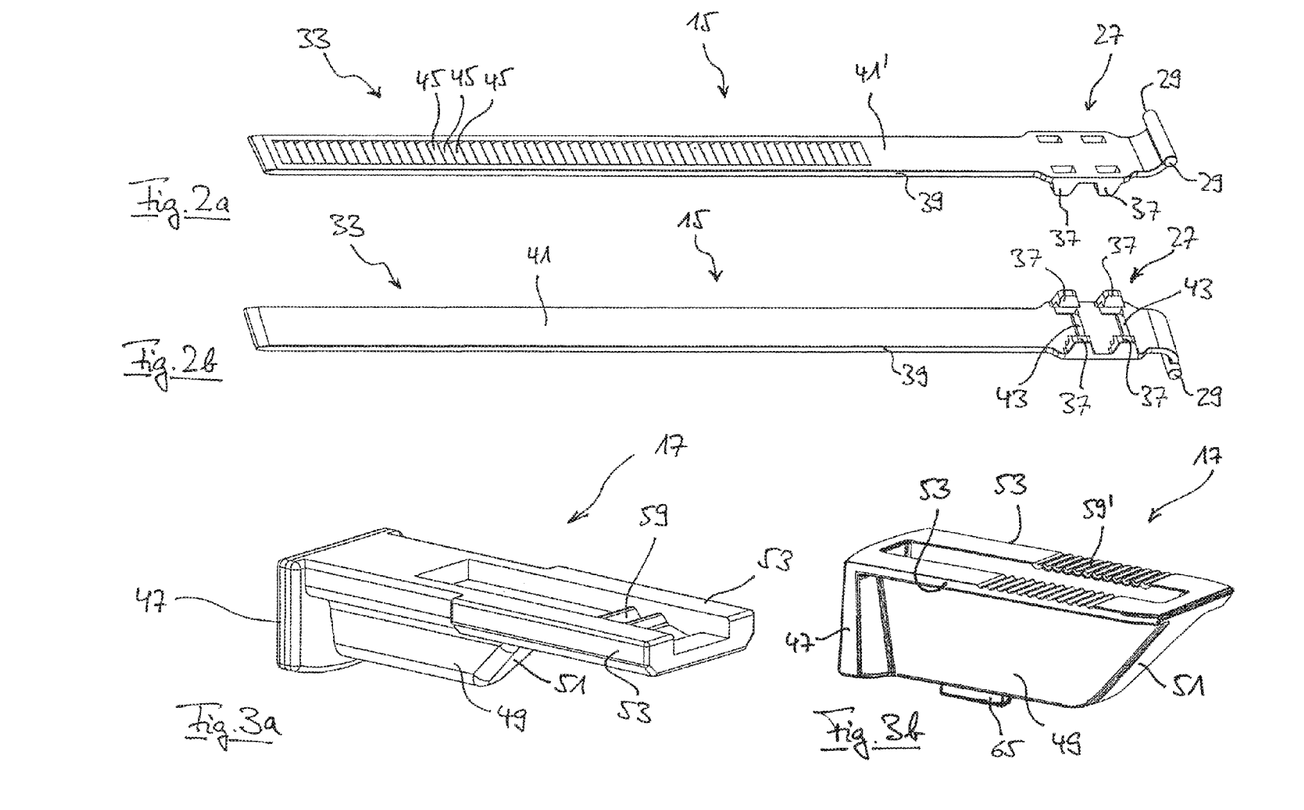
FIGS. 2a and 2b show the fastening band of this embodiment in two views.
FIGS. 3a and 3b show respective securing elements of two embodiments of the holder.

As can in particular be recognized in FIGS. 3a and 3b, the securing element 17 has, starting from the actuation section 47, a web section 49 which projects perpendicular to the longitudinal extent of the securing element 17 and which opens in a slanted flank 51. In the embodiment shown in FIG. 3a, the web section 49 extends approximately over half or two-thirds of the length of the securing element 17. In the embodiment shown in FIG. 3b, the web section 49 substantially extends over the total longitudinal extent of the securing element 17. Apart from the actuation section 47 and the web section 49, the securing element 17 is substantially areal, with guide sections 53 being formed at side edges and engaging into corresponding guide grooves (not shown) in the reception opening 35 of the base body 13 so that the securing element 17 is thereby guided on movements into or out of its securing position.

The reception opening 35 intersects the leadthrough 25, with only the part of the securing element 17 free of a web section projecting into the leadthrough 25 in the position of the securing element 17 releasing a leading of the fastening band through the leadthrough (cf. FIG. 1a). The fastening band 15 can thereby be led in this position of the securing element beneath and through the part of the securing element 17 free of a web section and thus substantially without hindrance on a direct path through the leadthrough 25. If the securing element 17 is subsequently displaced into its securing position, the web section 49 is urged with the aid of the slanted flank 51 in the manner of a wedge toward the fastening band 15 such that the web section 49 deflects the fastening band 15 onto a course in which the fastening band 15 is led around the web section 49.

Figures 4A, 4B:
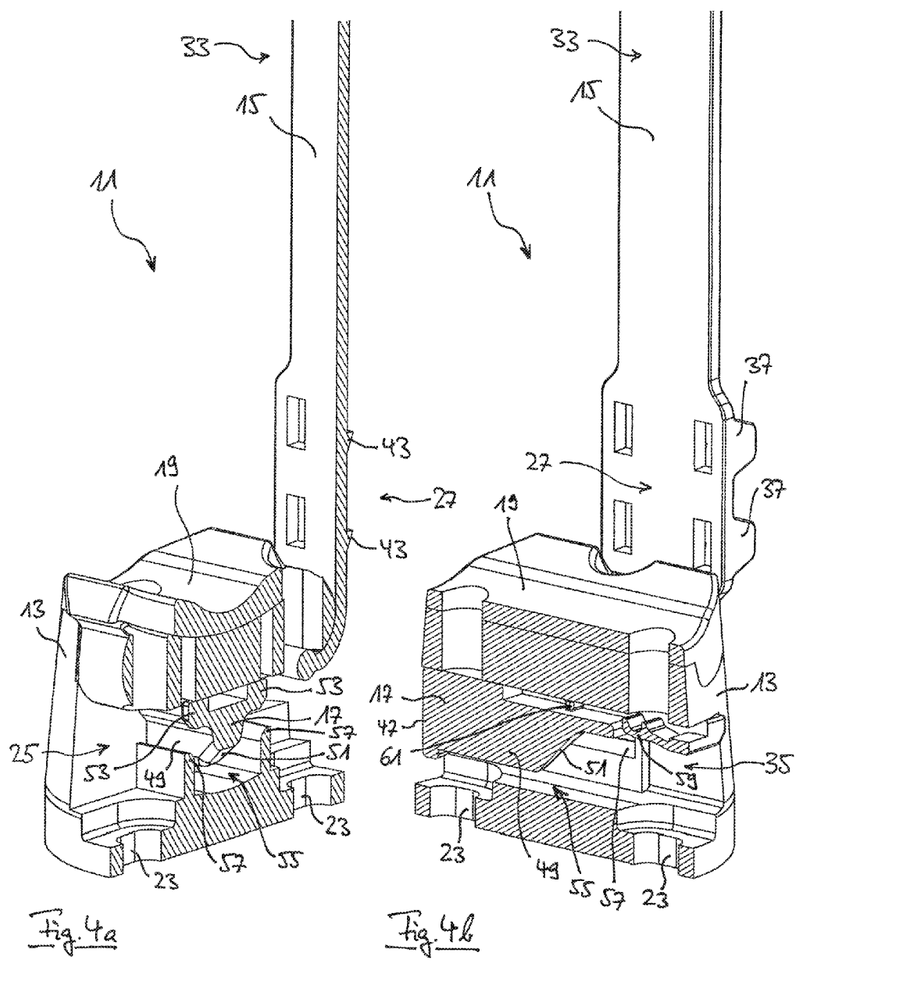
FIGS. 4a and 4b show sectional representations of the embodiment shown in F

The securing position of the securing element 17 is also shown in the sectional representations of FIGS. 4a and 4b. It can in particular be recognized in FIG. 4a how the web section 49 of the securing element 17 projects into the leadthrough 25 and prevents a straight-line extent of the fastening band 15 from the inlet-side end of the leadthrough 25 (at the left in the Figure) to the output-side end of the leadthrough 25 (at the right in the Figure) (cf. also the schematic drawing shown in FIG. 6c). it can furthermore be recognized that the leadthrough 25 has a deflection space 55 which is bounded at the inlet side and at the outlet side by a respective deflection edge 57.

While the leadthrough 25 has a cross-section in the region of the deflection edges 57 which is only slightly larger in a perpendicular direction to the extent of the leadthrough 25 and to the extent of the reception opening 35 than the thickness of the fastening band 15 (and is substantially formed as a slit), the cross-section of the leadthrough 25 is substantially increased in the region of the deflection space 35. This serves, on the one hand, so that the web section 49 can be received in the deflection space 55 in the securing position of the securing element 17. On the other hand, the fastening band 15 is actually deflected into this deflection space 55 by the web section 49. This is shown schematically in FIG. 6c. The fastening band 15 is therefore bent over three times by the deflection edges 57, on the one hand, and the web section 49, on the other hand, in the securing position of the securing element 17, namely at the inlet-side deflection edge 57 into the deflection space 55, then about the web section 49 of the securing element 17 and finally, on leaving the deflection space 55, at the outlet side of the deflection edge 57, back again to the further course, then unimpeded, through the leadthrough 25. The deflection in this respect has the double effect of, on the one hand, preventing a displacement of the fastening band 15 in the leadthrough 25 and thus of blocking the fastening band 15 in its position due to friction at the deflection points 49, 57. On the other hand, the path distance which the fastening band 15 requires for its course through the leadthrough 25 is extended by the deflection. Since the fastening band 15, however, is already placed tightly around a respective tube section of a two-wheeler, an even tighter contact of the fastening band 15 is effected, which acts on the tube section by tensile force or tensioning force, by this extension of the path distance.

In this respect, the fastening band 15 has a certain elasticity with a high spring constant so that a part of the named extension of the path distance can be compensated by the elasticity, which, however, advantageously results in an additional elastic tensioning force on the tube section. A particularly taut and fixed fastening of the holder 11 is hereby achieved at the respective tube section of a two-wheeler.

As can in particular be recognized in FIGS. 3a and 4b, the securing element 11 optionally has a latching tongue 59 which is configured to cooperate with latching projections 61 which are formed in the reception opening 35 and of which only one can be recognized in FIG. 4b in order at least to prevent an. accidental complete release of the securing element 17 from the base body 13 so that the securing element 17 cannot be lost. A further cooperation of the latching tongue 59 with a latching projection 61 can be provided to hold the securing element 17 more intensely in a respective position, in particular in the securing position, for example so that the securing element 17 cannot be urged out of the securing position into a releasing position due to the tensioning of the fastening band 15.

Alternatively to the latching tongue 59, as in the embodiment of FIG. 3b, other types of latching means 59 can also be provided at the securing element 17 in order, for example, to cooperate with the named latching projections 61. These latching means 59' can, as shown in FIG. 3b, be formed as a ribbing to effect a latching of the securing element 17 in different introduction depths. In this manner, a plurality of securing positions can be defined which differ with respect to the respective introduction depth of the securing element 17.

Figures 5A, 5B:
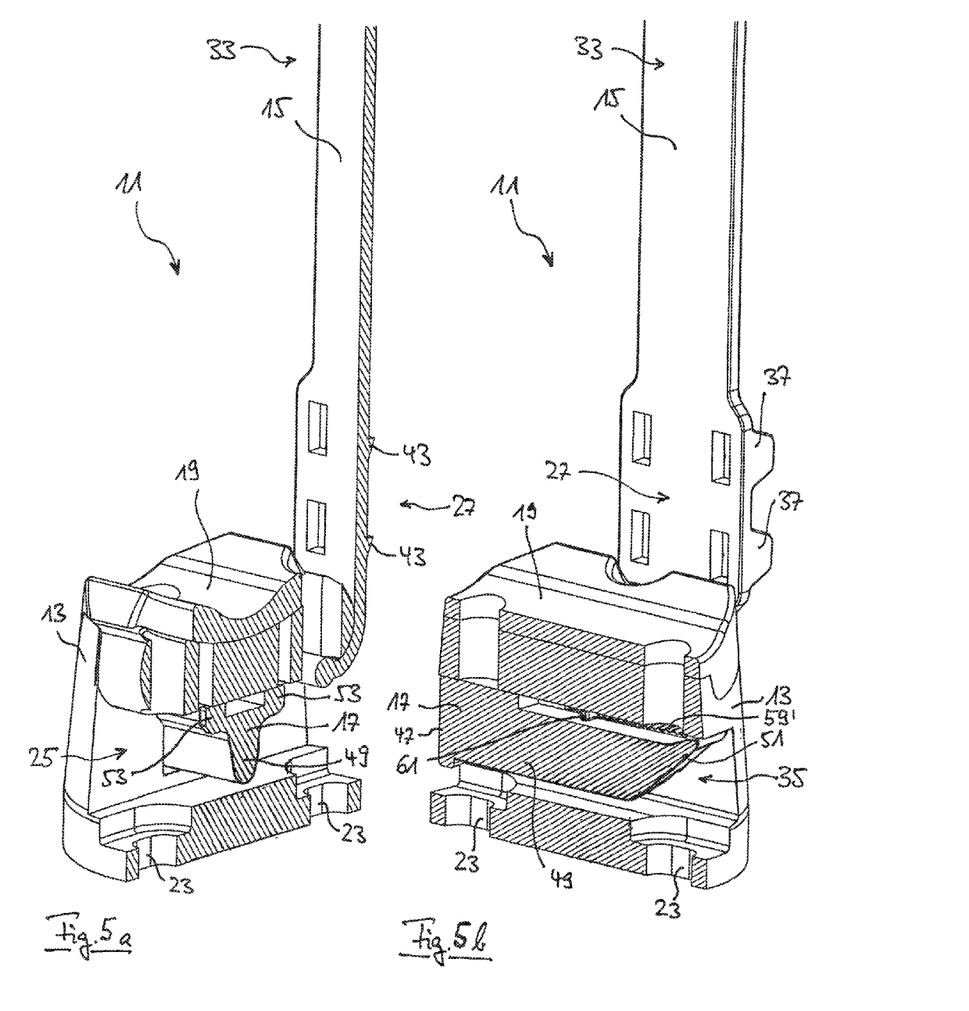
FIGS. 5a and 5b show sectional representations of a further embodiment.

FIGS. 5a and 5b largely correspond to FIGS. 4a and 4b. The embodiment shown in FIGS. 5a and 5b substantially only differs from the one shown in FIGS. 4a and 4b in that the securing element 17 and the leadthrough 25 are differently designed. The leadthrough 25 namely has no deflection space 55 and consequently also no deflection edges 57 bounding the deflection space 55, but rather has a substantially continuously constant cross-section. In this embodiment, a deflection of the fastening band 15 only takes place by the web section 49 which is designed such that a sufficient tensioning force is also achieved for a stable fixing of the fastening band 15 without an additional deflection at deflection edges 57. The securing element 17 in this embodiment particular formed in a similar manner to that shown in FIG. 3b, that is it has a comparatively long web section 49 whose flank 51 starts directly at the one end (disposed opposite the actuation section 47) of the longitudinal extent of the securing element 17. The fastening band 15 extending through the leadthrough 25 is thereby strongly deflected at an early time such that a secure fixing of the fastening band 15 takes place.

Whereas in the embodiments shown in FIGS. 1 to 5 the blocking and tensioning of the fastening band 15 in the leadthrough 25 of the base body 13 substantially takes place with force transmission, a shape-matched blocking of the fastening band 15 against a displacement in the leadthrough 25 is also additionally or alternatively possible. This is shown by way of example in the schematic representations of FIGS. 6a and 6b. It can be recognized in them that the fastening band 15 has a plurality of engagement recesses 63 at a flat side 41' so that the securing element 17 or a web section 49 of the securing element 17 can engage into a respective one of the engagement recesses 63 when the web section 49 is in the securing position. The fastening band 15 is then prevented from a displacement in the leadthrough 25, at least in one direction, by this engagement. The engagement recesses 63 can be the latching notches 45. The engagement recesses 63 and the latching notches 45 can, however, also be formed separately from one another, for instance in different regions of the fastening band 15, and can have different profiles adapted to their respective purpose.

Figure 6A:
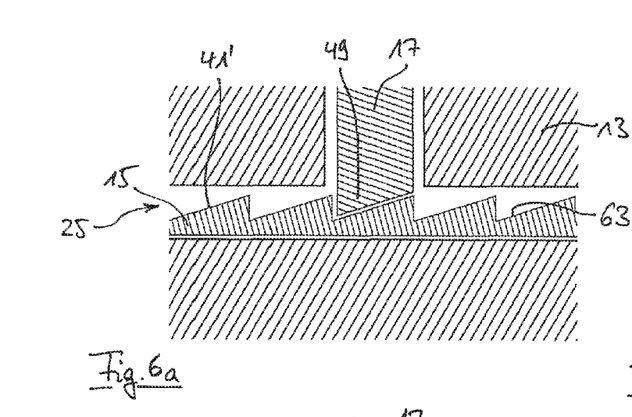
FIGS. 6a to 6c show different embodiments of the design of the securing element and of the fastening band in schematic sectional representations.
Figure 6B:
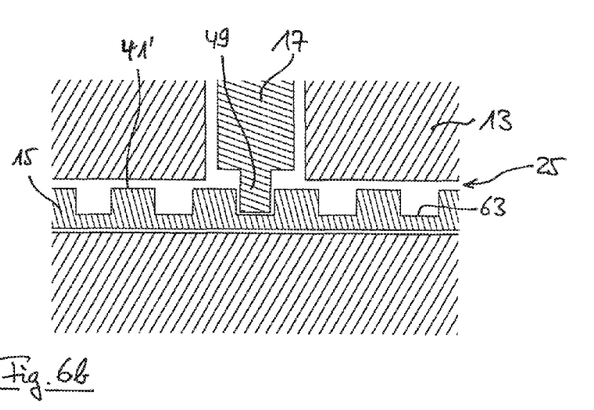

Whereas in the embodiment in accordance with FIG. 6a, the fastening band 15 is blocked against a movement in only one direction, namely preferably in that direction which would result in an extension of the loop formed by the fastening band 15, the embodiment in accordance with FIG. 6b effects a complete blocking in both directions of movement. The profiles shown of the engagement recesses 63 of the fastening band 15 or of the web section 49 of the securing element 17 are only by way of example and can generally have a variety of other shapes which allow a shape-matched blocking of the fastening band 15. An engagement projection 65 can in particular be formed at the web section 49 in order to be able to engage in a defined manner into a respective engagement recess 63 in addition to the general deflection effect of the web section 49. Such an engagement projection 65 is shown by way of example schematically in FIG. 3b. The engagement projection 65 can in this respect in particular have a smaller length than the web section 49 which is matched to the width of corresponding engagement recesses 63 formed at the fastening band 15. Since the engagement projection 65 is only formed in one region, in particular a center region, of the longitudinal extent of the web section 49, the fastening band 15 is less loaded while it is being tensioned and/or blocked by the securing element 17 and is therefore less at risk of being damaged by an excessive effect of the web section 49. The length of such an engagement projection 63 can generally amount to approximately one third or to approximately half or to approximately two thirds of the length of the securing element 17.

Figure 6C:
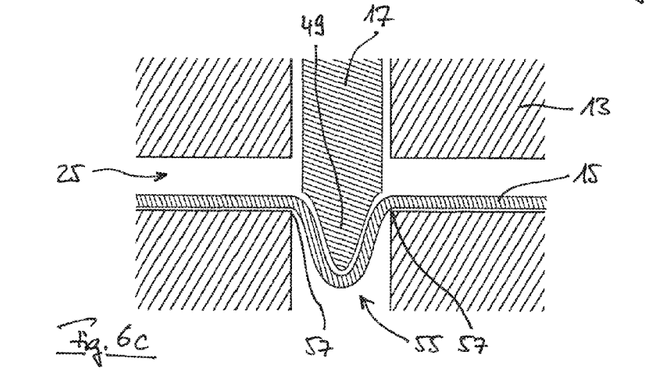

A combination of the shaped-matched blocking is in particular also possible, for example in accordance with FIG. 6b, and of the three-transmitting blocking and/or tensioning, for example, in accordance with FIG. 6c, with the web section 49 in the securing position of the securing element 17 then both engaging into a respective engagement recess 63 of the fastening band 15 and deflecting and tensioning the fastening band 15 in the region of this engagement recess 63.

The exemplary embodiments show that the holder 11 in accordance with the invention for two-wheeler accessories can be actuable in a particularly simple manner and can in particular be fastened without tools, to a respective tube section of a two-wheeler in a manner which results in a special stability and reliability of the arrangement.

The invention claimed is:

1. A holder (11) for a two-wheeler accessory, in particular for a two-wheeler lock, comprising:
   a fastening band (15) for wrapping around a tube section of a two-wheeler, wherein the fastening band (15) has a first end and a second, loose end (27, 33);
   a securing element (17);
   and a base body (13) which has a support section (19) for contacting the tube section of the two-wheeler, a holding device (21) for the two-wheeler accessory or for an accessory-specific adapter piece, leadthrough (25) for at least the second end (33) of the fastening band (15) and a reception opening (35) for the securing element (17) aligned transversely to the leadthrough (25),
   wherein the fastening band (15) is displaceable along the leadthrough (25) when it is led through the leadthrough (25); and
   wherein the securing element (17) is movable into a securing position in which the securing element (17) is at least partly located in the reception opening (35) and tensions the fastening band (15) in the leadthrough (25) by deflection and/or blocks the fastening band (15) in the leadthrough (25) against a displacement.

2. A holder in accordance with claim 1,
wherein the first end (27) of the fastening band (15) is fastened to the base body (13).

3. A holder in accordance with claim 2,
wherein the first end (27) of the fastening band (15) is pivotably fastened to the base body (13).

4. A holder in accordance with claim 2,
wherein the first end (27) of the fastening band (15) is hung in at the base body (13).

5. A holder in accordance with claim 4,
wherein the first end (7) of the fastening band (15) has two lateral spigot sections (29) by means of which the fastening band (15) is hung in an associated reception recess (31) at the base body (13).

6. A holder in accordance with claim 1,
wherein the fastening band (15) is elastic in order to generate a permanent tensile force between the first end (27) and the second end (33) by a tensioning of the fastening band (15) during and/or after the wrapping around of the tube section of the two-wheeler.

7. A holder in accordance with claim 1,
wherein a closure device (37, 43, 45) is formed at the fastening band (15) outside the base body (13) for fixing the length of a loop formed by the fastening band (15).

8. A holder in accordance with claim 7,
wherein respective fixing means (37, 43, 45) are associated with the first end (27) of the fastening band (15) and with the second end (33) of the fastening band (15) to fix an overlap of the second end (33) of the fastening band (15) led through the leadthrough (25) with the first end (27) of the fastening band (15).

9. A holder in accordance with claim 8,
wherein the fixing means associated with the first end (27) of the fastening band (15) have a plurality of holding noses (37) to hold the second end (33) of the fastening band (15) contacting the fastening band (15) in the region of the holding noses (37), or vice versa.

10. A holder in accordance with claim 9,
wherein the holding noses are formed in pairs to engage respective oppositely disposed narrow sides (39) of the fastening band (15).

11. A holder in accordance with claim 8,
wherein the fixing means associated with the first end (27) of the fastening band (15) have at least one fixing tooth (43) and the fixing means associated with the second end (33) of the fastening band (15) have a plurality of fixing notches (45), or vice versa, to fix the amount of the overlap by the engagement of the at least one fixing tooth (43) into a respective fixing notch (45).

12. A holder in accordance with claim 11,
wherein the at least one fixing tooth (43) is provided at a flat side (41) of the fastening band (15) and the plurality f fixing notches (45) are provided at an oppositely disposed flat side (41') of the fastening band (15).

13. A holder in accordance with claim 1,
wherein the securing element (17) is adapted to move the fastening band (15) located in the leadthrough (25) away from the support section (19) of the base body (13) by a movement into the securing position in order to tension the fastening band (15).

14. A holder in accordance with claim 1,
wherein the leadthrough (25) has a deflection space (55) which is bounded with respect to the lead-through direction of the fastening band (15) at both sides by a respective deflection edge (57), wherein the region of the deflection space (55) has an enlargement of the cross-section with respect to the regions of the deflection edges (57).

15. A holder in accordance with claim 1,
wherein the holder (11) is configured such that
the second end (33) of the fastening band (15) can be guided through the leadthrough (25) in accordance with a direct course; and
when the second end (33) of the fastening band (15) is guided through the leadthrough (25) in accordance with the direct course and the securing element (17) is moved into the securing position, the fastening band (15) is deflected by the securing element (17) to a deflected course which is longer than the direct course, in order to tension the fastening band (15).

16. A holder in accordance with claim 1,
wherein the fastening band (15) has a plurality of engagement recesses (63) at a flat side (41'), wherein the securing element (17) engages into at least one of the engagement recesses (63) in the securing position.

17. A holder in accordance with claim 1,
wherein the securing element (17) has a web section (49) which extends in the direction of the movability of the securing element (17) in the reception opening (35) and which projects perpendicular to this direction, and wherein the web section (49) is configured to deflect the fastening band (15) and/or to engage into the fastening band (15) in the securing position of the securing element (17).

18. A holder in accordance with claim 17,
wherein the web section (49) has a slanted flank (51) in the direction toward the securing position to deflect the fastening band (15) increasingly on a movement of the securing element (17) into the securing position.

19. A holder in accordance with claim 17,
wherein the web section (49) extends from an end of the securing element (17) oriented in the direction away from the securing position over a part of the length of the securing element (17) in the direction of an end of the securing element (17) oriented toward the securing position.

20. A holder in accordance with claim 1,
wherein respective latching means (59, 59, 61) are provided at the base body (13) and at the securing element (17) to latch the securing element (17) in the securing position.

21. A holder in accordance with claim 1,
wherein respective securing means (59, 59, 61) are provided at the base body (13) and at the securing element (17) to secure the securing element (17) against an unintentional release from the base body (13).

22. A holder in accordance with claim 1,
wherein the reception opening (35) is formed continuously at the base body (13) and is formed such that the securing element (17) can be introduced into the reception opening (35) from both ends thereof.

23. A holder in accordance with claim 1,
wherein the leadthrough (25) and the reception opening (35) of the base body (13) are formed in a similar manner to one another such that the fastening band (15) can be selectively guided through the reception opening (35) and the securing element (17) can be selectively moved in the leadthrough (24) into a securing position in which the securing element (17) tensions the fastening band (15) in the reception opening (35) by deflection and/or blocks the fastening band (15) in the reception opening (35) against a displacement.

* * * * *